United States Patent [19]

Ardon

[11] Patent Number: 5,699,419
[45] Date of Patent: *Dec. 16, 1997

[54] ANALOG MULTIBUTTON TELEPHONE KEYSETS

[75] Inventor: Menachem Tsur Ardon, Naperville, Ill.

[73] Assignee: Lucent Technologies Inc., Murray Hill, N.J.

[*] Notice: The term of this patent shall not extend beyond the expiration date of Pat. No. 5,544,235.

[21] Appl. No.: 359,707

[22] Filed: Dec. 20, 1994

Related U.S. Application Data

[63] Continuation of Ser. No. 26,952, Mar. 5, 1993.

[51] Int. Cl.[6] .................. H04M 1/00; H04M 1/60; H04M 3/00
[52] U.S. Cl. .................. 379/156; 379/164; 379/177; 379/373; 379/376; 379/251; 379/252
[58] Field of Search .................. 379/142, 156, 379/157, 160, 164, 165, 214, 373, 375, 376, 251-253, 218, 396, 233, 171, 177, 179, 183

[56] References Cited

U.S. PATENT DOCUMENTS

| | | | |
|---|---|---|---|
| Re. 31,789 | 1/1985 | Hashimoto | 379/142 |
| 4,582,956 | 4/1986 | Doughty | 179/2 A |
| 4,672,660 | 6/1987 | Curtin | 379/245 |
| 4,720,848 | 1/1988 | Akiyama | 379/88 |
| 4,763,191 | 8/1988 | Gordon et al. | 358/86 |
| 4,763,353 | 8/1988 | Canale | 379/157 |
| 4,776,005 | 10/1988 | Petriccione | 379/142 |
| 4,788,682 | 11/1988 | Vij | 379/96 |
| 4,873,716 | 10/1989 | Brady | 379/165 |
| 4,873,717 | 10/1989 | Davidson | 379/157 |
| 4,893,336 | 1/1990 | Wuthnow | 379/164 |
| 4,905,274 | 2/1990 | Cooper | 379/157 |
| 4,907,259 | 3/1990 | Frech | 379/165 |
| 4,942,598 | 7/1990 | Davis | 379/57 |
| 4,985,913 | 1/1991 | Shalom et al. | 379/76 |
| 4,998,273 | 3/1991 | Nichols | 379/373 |
| 5,029,202 | 7/1991 | Doernbach | 379/375 |
| 5,040,209 | 8/1991 | Greenberg | 379/373 |
| 5,097,528 | 3/1992 | Gursahaney | 379/142 |
| 5,144,653 | 9/1992 | Masuoka | 379/165 |
| 5,263,084 | 11/1993 | Chaput | 379/142 |
| 5,265,145 | 11/1993 | Lim | 379/142 |
| 5,544,235 | 8/1996 | Ardon | 379/164 |

FOREIGN PATENT DOCUMENTS 2258119  1/1993  United Kingdom.

OTHER PUBLICATIONS

"Facilities for Users of SOPHO–SET Feature Phones", PTR Philips Telecommunication and Data Systems Review, 48(1990) Mar., No. 1, Hilversum, NL, pp. 20–27.

"Digital Answering System Speakerphone 1545"—Owner's Manual 503–501–029—AT&T 1992.

*Primary Examiner*—Curtis Kuntz
*Assistant Examiner*—Vijay Shankar
*Attorney, Agent, or Firm*—Michael B. Johannesen

[57] ABSTRACT

A keyset that connects to telephone switches via analog lines, wherein a processor in the keyset communicates with the switch via in-band signaling to provide keyset functionary. When a call comes into the switch for one of the directory numbers (DNs) associated with the keyset, the switch sends a frequency shift key (FSK) encoded message to all of the keysets associated with that DN. The FSK message includes at least the DN of the terminating telephone line, and may also include an extension number or other code. The processor in the keysets receives the message, decodes it, and then alerts the users of the incoming call.

23 Claims, 7 Drawing Sheets

ANALOG MULTIBUTTON TELEPHONE KEYSETS

This application is a continuation of application Ser. No. 08/026,952, filed on Mar. 5, 1993.

CROSS-REFERENCE TO RELATED APPLICATION

This application is related to U.S. patent application Ser. No. 08/026,919, entitled "System and Method to Identify the Terminating Directory Number at the Customer Premises when Multiple Directory Numbers are Assigned to One Line," filed concurrently with this application.

TECHNICAL FIELD

This invention relates to the field of customer premises telephone equipment, and, more specifically, to telephone keysets.

BACKGROUND OF THE INVENTION

Telephone keysets are an important segment of the telephone equipment market for small to mid-sized service-oriented businesses, which is a segment of the market that has growing, increasingly complex telecommunications needs. Keysets (telephones that terminate multiple lines and have a plurality of buttons or "keys" that connect the handset to each of the lines) permit small businesses to have multiple telephone lines and multiple directory numbers (DNs) at their premises without having to buy or lease expensive customer premises switching equipment. Since the terminology in the art is not clear, "buttons" (for the purposes of this patent application) refer to the dual-tone multi-frequency keypad that is found on all touchtone telephones. "Keys" refer to the keys that cause a connection of a telephone to a line. Some keysets with a plurality of keys are, however, referred to as multibutton keysets to correspond to general usage.

Most small businesses are served by analog lines, and until recently, each keyset had a bundle of wires, including tip-ring pair for each of the line's power service connections, and an inter-office circuit. This bundle becomes quite thick as the number of lines increases. Businesses having more than one keyset are complicated to wire. Some manufacturers make keysets that requires fewer line connections to the switch, but these keysets require out-of-band signaling and a special line card at the switch to effect such signaling. These special line cards are expensive to the operating company and take up frame space that could be used for more lines.

One solution to this problem is provided by digital keysets connected to a digital switching system. Such digital keysets, such as integrated services, digital network (ISDN) sets, are connected to the switch by a two or four-wire line which provides two voice channels and a data channel. Using out-of-band signaling (or messages on the data channel), a call is set up to one of the telephones, and more than one telephone may be alerted to the incoming call. In this manner, a business can have several ISDN telephones on premises with several directory numbers (DNs) associated with them and have all telephones alerted when a call comes in for one of the DNs.

Digital keyset systems, however, are not in widespread use at this time. Installing a digital keyset system requires that the operating company have a digital switch, with either a digital line unit or an integrated services line unit. Thus, the telephone operating companies have a significant capital outlay in order to provide this service to small customers. The telephone station sets are expensive and, for certain types of ISDN, the lines that connect the customer premises to the switching system must be, in some cases, upgraded to four wire connections.

Therefore, a problem in the art is that there is no inexpensive system that can be used on any switch supporting analog lines to provide customer premises keysets that can be connected to any currently existing switch, line unit and line cards.

SUMMARY OF THE INVENTION

This invention provides an inexpensive keyset that connects to any switch supporting analog lines via tip-ring pairs, and does not require a special switch, line unit or line card. The keyset communicates with the switch via in-band signaling over the tip-ting pair to provide keyset functionality. When a call arrives at a switch for one of the directory numbers (DNs) associated with the keyset, the switch sends a frequency shift key (FSK) encoded message to all of the keysets associated with that DN before applying ringing. The FSK message includes at least the DN of the terminating telephone, and may also include an extension number or other code. The keysets receive the message, decode it, and then alert the user(s) of the incoming call so that it can be answered. Alerting may take the form of displaying the terminating DN, lighting a prespecified lamp on the telephone on or near a key, creating a special audible ringing or other suitable alerting.

In this manner, a keyset may be economically developed without the need for special wiring at the user's place of business or special line cards at the telephone switching system.

In a first exemplary embodiment (FIG. 1) a plurality of keysets according to the present invention are connected via tip-ting pairs to an ordinary line card of a telephone switching system. The telephone station sets are connected via lines which are associated with a plurality of directory numbers such that, in this exemplary embodiment there are assumed to be five DNs, hence, more directory numbers than there are telephone station sets. Each line is designated as a lead line for one or more directory numbers, a dependent line for a directory number, or designated to have no relation to a specific directory number. When the switch has received an incoming call for one of the plurality of directory numbers, it encodes the terminating called line identification (TCLID) using frequency shift key encoding, and delivers the TCLID to all telephone lines that are designated as lead or dependent. The switch also sets up the call to the telephone line designated as the lead. If the call is answered at the lead line telephone station set, the call is completed to that set and notification to the other sets ceases. To answer a call from another set, the user gives an offhook signal to the switching system, which gives dial tone in response. The user then causes the keyset to generate signaling in any of a variety of well known ways. In response, the switching system delivers the call to that keyset. Alerting the keysets is then stopped.

In a second exemplary embodiment (FIG. 3), a plurality of keysets are connected to a TCLID operated switch, which is connected to a switching system via a single line. There are a plurality of directory numbers associated with keysets. When the switching system delivers a call for one of the directory numbers, it first encodes the terminating DN using FSK and sends the FSK signal to the TCLID operated switch. The TCLID operated switch decodes the FSK signal and determines which one or more of the plurality of telephones to alert responsive to this DN. The TCLID operated switch then alerts the telephones and delivers the call to the first telephone that signals to the TCLID operated switch.

In a third exemplary embodiment (FIG. 4) a plurality of telephones are connected to a TCLID operated switch, as above, however the TCLID operated switch is connected to a switching system via a plurality of lines. In this embodiment, when a call is received for one of the plurality of DNs associated with the plurality of telephones, the switch hunts an available line among the plurality of lines and delivers the FSK encoded TCLID to the TCLID operated switch. The TCLID operated switch determines which one or more of the plurality of telephones to alert and alerts these phones. The TCLID operated switch connects the line of the incoming call to the first telephone that signals to answer the call.

In a fourth exemplary embodiment (FIG. 6), a plurality of telephones associated with a plurality of directory numbers are connected to a switching system via a plurality of lines. Each of the plurality of telephones is associated with the plurality of telephone numbers as either a lead, dependent or no association, as above. When a call comes in for one of the plurality of directory numbers at the switch, the switch hunts an available line and delivers the FSK encoded TCLID, as above. The keysets display the TCLID, or otherwise alert, in response to the TCLID. Any keyset can then connect to the line. Optionally, one of the lines connected to all of the keysets may be dedicated to signaling; in which case, all signaling communication between the keyset and the switch on this line is "out-of-band."

In a further exemplary embodiment (FIG. 7), a TCLID operated switching device is connected to a keyset and to two (or more) switching systems. A call for the directory number associated with the telephone station set is delivered via one of the switches and the switch delivers the TCLID to the TCLID switch. The TCLID switch converts the FSK into digits and alerts the keyset responsive thereto.

BRIEF DESCRIPTION OF THE DRAWINGS

A more complete understanding of the invention may be obtained from consideration of the following description in conjunction with the drawings in which.

DETAILED DESCRIPTION

Figure 1:
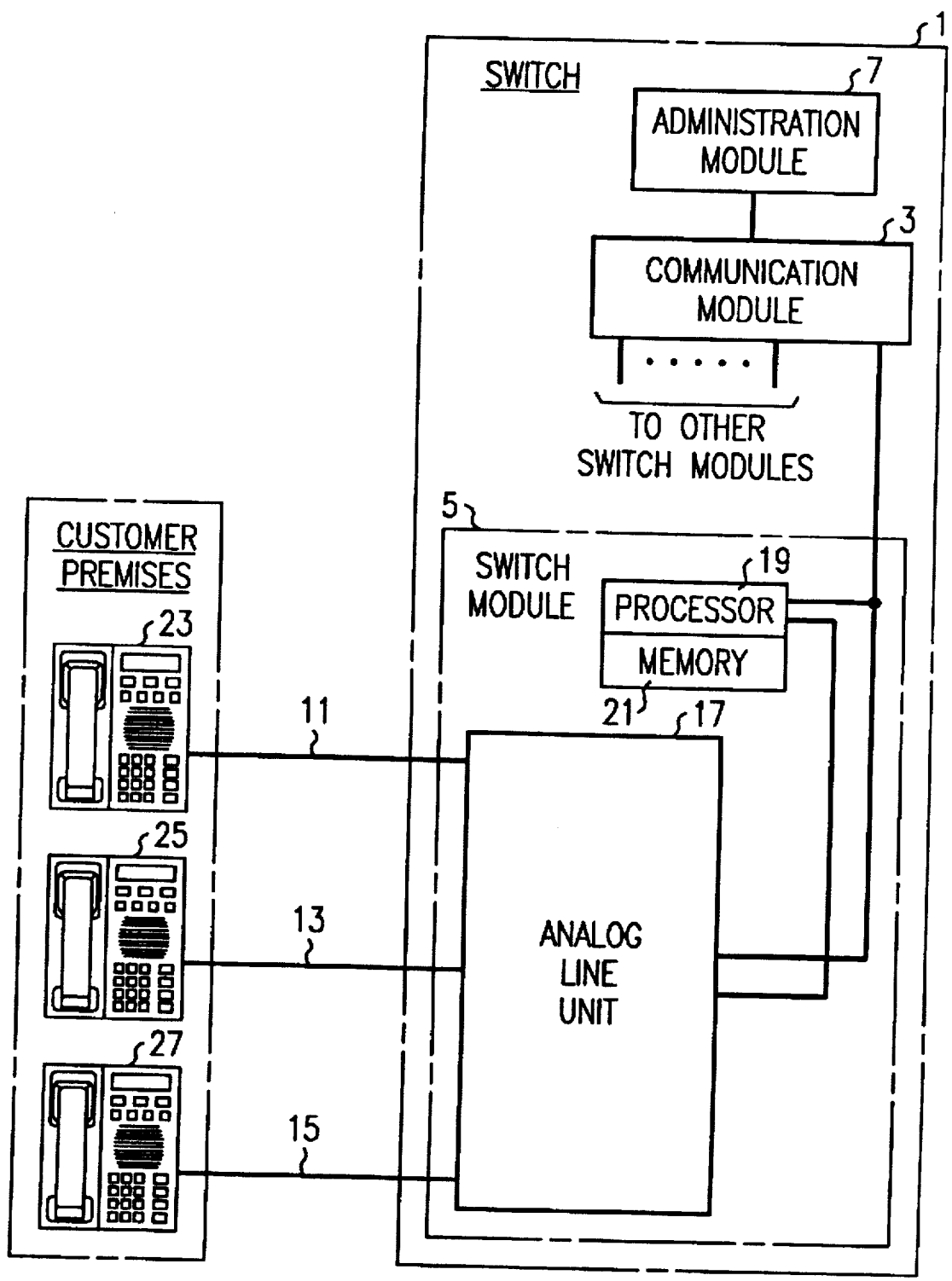
FIG. 1 is a block diagram of a telephone switching system connected to a plurality of analog multibutton keysets according to an exemplary embodiment of this invention.

An exemplary embodiment of an analog multibutton keyset system is described herein in context of a telephone switching system, as illustrated in FIG. 1, having a central office switch 1. Switch 1 is, illustratively, a distributed control, digital switch such as a 5ESS® switch manufactured by AT&T and described in the AT&T Technical Journal, Vol. 64, No. 6, July/August, 1985, pages 1303-1564. Alternatively, switch 1 may be an analog electronic switching system, such as a 1ESS™ or 1AESS™ switch manufactured by AT&T, without departing from the scope of this invention.

The architecture of switch 1 includes communications module 3 as a hub with switching module 5 and other switching modules (not shown for clarity), and administrative module 7 emanating therefrom. Switching module 5 terminates analog and/or digital subscriber lines, such as analog lines 11, 13, and 15 through line units, such as analog line unit 17, and analog or digital trunks. Administrative module 7 provides coordination of the functional components of switch 1 and provides a human/machine interface. Switching module 5 also includes processor 19 and memory 21. Processor 19 controls the functionality of switch module 5, and uses memory 21 to store the programs and data by which it operates.

Line unit 17 provides the interface between telephones such as telephones 23, 25, and 27 the switching fabric of SM 5 (not shown, but well known in the art). Line unit 17 provides line concentration, scanning, and other services as is known in the art and will, therefore, not be described further. Line unit 17 also provides service circuits for applying ringing, and other telephony functions.

An exemplary embodiment of this invention may be seen in the interaction between SM 5 and telephones 23, 25, and 27, which are connected via lines 11, 13, and 15 respectively. Telephones 23, 25, and 27 represent a plurality of telephones at a customer premises, for example, a real estate office or small law firm. For purposes of this example, the customer subscribes to five directory numbers (DNs) which all terminate to telephones 23, 25, and 27 at the customer's premises via telephone lines 11, 13, and 15. Each telephone line has one or more lead DNs and may have dependent DNs. A lead telephone line is one that an incoming call is set up to every time the DN is called. A dependent telephone line is one that is alerted or signaled when the DN is called, and may pick up a call to the DN if desired. Lines 11, 13, and 15 are associated with the five directory numbers in accordance with Table 1.

TABLE 1

|  | DN1 | DN2 | DN3 | DN4 | DN5 |
| --- | --- | --- | --- | --- | --- |
| Line 11 | L | L | D | D | * |
| Line 13 | D | * | L | L | * |
| Line 15 | D | * | * | * | L |

According to Table 1, Line 11 is the lead line for directory numbers 1 and 2, and a dependent line for directory numbers 3 and 4. Line 13 is not associated with directory number 5 at all. Likewise, line 13 is the lead line for directory numbers 3 and 4, dependent line for directory number 1 and is not associated with directory numbers 2 and 5. Finally, line 15 is lead line for directory number 5, a dependent line for directory number 1 and is not associated with directory numbers 2, 3, and 4.

As a call arrives at switch 1 for one of the directory numbers associated with the customer premises, for example, directory number 1, the telephone call is delivered to SM 5. Processor 19 performs a database search in memory 21 to determine what line or lines are associated with the directory number. In this case, processor 19 determines that line 11 is the lead telephone line and telephone lines 13 and 15 are dependent telephone lines for this directory number. Responsive to determining that telephone 11 is the lead line, processor 19 causes line unit 17 to set up the call to line 11, as is known in the art.

As a next step, processor 19 causes line unit 17 to generate a frequency shift key (FSK) signal encoding the termination called line identification (TCLID) into signal, which is then sent across lines 11, 13, and 15. Optionally, ringing can then be applied to one or more of the lines, as is known in the art. Other data may also be sent on the lines, such as extension numbers, special codes, and the like, which may have the same effect as the TCLID.

At the customer premises, telephones 23, 25, and 27 all receive the TCLID approximately simultaneously. A converter in the telephones, as will be described further in connection with FIG. 2, receives the FSK signal and demodulates it. A control unit in telephones 23, 25, and 27 then causes the demodulated TCLID to be indicated at the telephone. This indication may be via a display or could light a lamp on or next to a key on the telephone, as is known in the art. The telephones 23, 25, and 27 may then ring or otherwise audibly alert the users either responsive to receipt of the FSK signal or, optionally, in response to ringing being applied to lines 11, 13, and 15. If the user of telephone 23 picks up the handset, the call is connected, as is known in the art, and switch 1 ceases alerting of telephones 23, 25 and 27.

If the user of telephones 25 or 27 picks up (for example, when telephone 23 is busy) then other steps are taken. The user of telephone 25 lifts the handset, which causes the telephone 25 to give an offhook to line unit 17. Line unit 17 then provides dial tone to telephone 25. This is important because the user of telephone 25 may wish to dial out at this time instead of answering telephone 23. SM 5 expects to receive signaling from telephone 25 at this point. Telephone 25 signals to line unit 17 that the user wants to answer the line for telephone 23. Signaling from telephone 25 to line unit 17 could be, for example, dual-tone, multifrequency (DTMF) signaling, as is common from a touchtone phone. This signaling could be in the form of a special number sequence from the keypad buttons, for example, *7, as the sequence for call pickup. Alternatively, call pickup signaling sequences can be preprogrammed into the keys of telephone 25, and signaling the switch system is accomplished by pressing a key on the keyset 25. For example, a key with the phone number of DN 1 causes DTMF or other signaling to be sent to SM 5. Alternatively, an encoded signal identifying the key is sent to SM 5 which may then perform a lookup to determine which DN is being picked up.

This system also provides multiple call appearances for each line. If, in the previous example, telephone 23 is busy on DN 1, and another call comes in for DN 1, line unit 17 can provide an FSK encoded TCLID signal to telephone 23 and a call waiting tone to alert telephone 23 that there is another call for DN 1. Line unit 17 also sends the TCLID to telephones 25 and 27 that a call is waiting for DN 1. The users of telephones 25 and 27 then decide whether to answer the call, as described above. Alternatively, SM 5 may present the second call to telephones 25 and 27 via the FSK signal and not to telephone 23. Additionally, a hunt group feature may be used to deliver the call as an alternate lead line, for example, line 25, and line 27 is then a dependent line.

According to Table 1, a call for DN 2 will only be presented to telephone line 11 and no TCLID is sent to either telephone line 13 or 15. This provides a private line to telephone 23 that will not terminate to any other phone in the office. Likewise, DN 5 will only cause an alerting signal to be given at telephone 27 and no other telephone in the office will be alerted. DNs 3 and 4 have a lead telephone line of 13 and dependent telephone line 11, and no FSK signal or alerting is sent to telephone 27.

Figure 2:
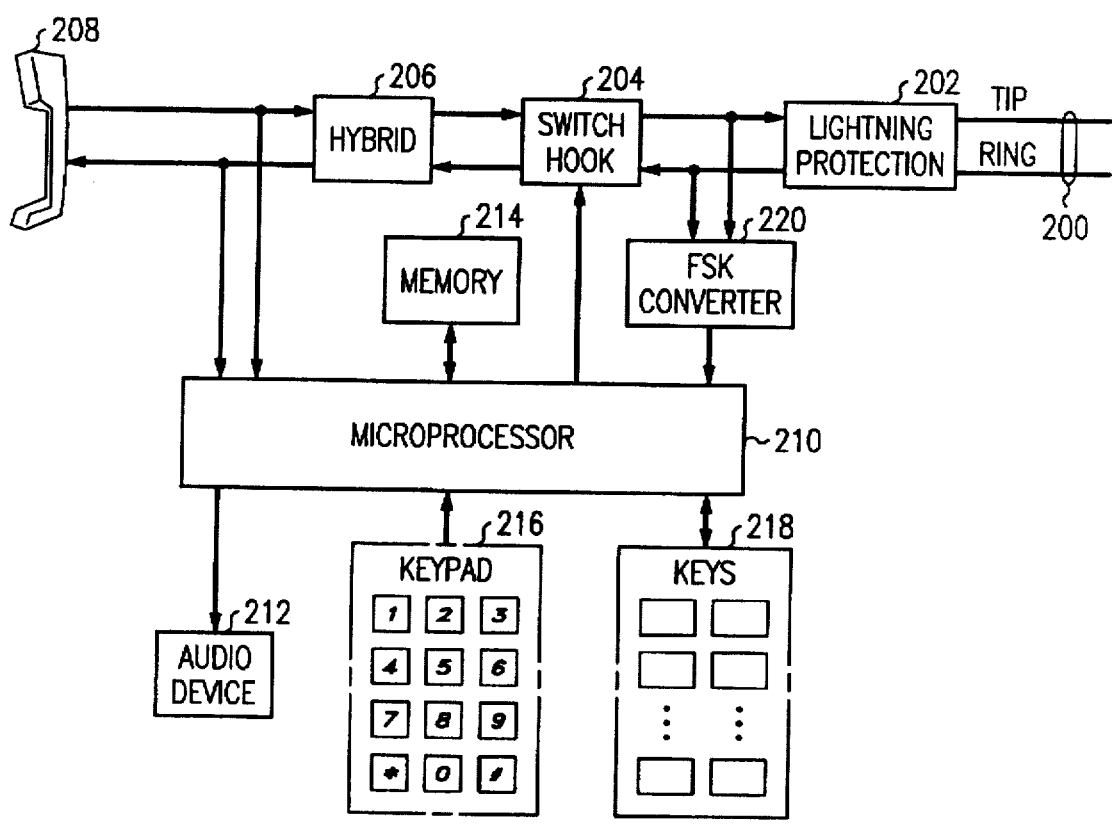
FIG. 2 is a functional block diagram of an analog multibutton keyset according to an exemplary embodiment of this invention.

Turning now to FIG. 2, functional block diagram of an analog multibutton keyset, such as keysets 23, 25, and 27, is shown. One analog, two-wire (tip-ring) pair 200, as is known in the art, connects the telephone to line unit 17. Tip-ring pair 200 delivers signals through lightening protection device 202 to switch hook 204. Switch hook 204 provides onhook and offhook indications to line unit 17. Signals are delivered from switch hook 204 to a two-wire to four-wire converter circuit or hybrid 206. Hybrid 206 converts tip-ring (a full duplex connection to the telephone network) to a receive audio path and a transit audio path. Receive audio path and transmit audio path are connected to the speaker and microphone, respectively, of handset 208 as is known in the art.

Switch hook 204 provides onhook and offhook indications to the network under control of microprocessor 210. Microprocessor 210 also controls audio device 212 to provide an audible alerting signal when an incoming call is received. Microprocessor 210 is connected to memory 214, which stores programs and data used by microprocessor 210, as is known in the art. Microprocessor 210 receives input from keypad buttons 216 and provides DTMF signaling to the network responsive thereto, as is known in the art. Microprocessor 210 also communicates with keys 218. Microprocessor 210 may, in one embodiment of this invention, illuminate lamps next to certain keys responsive to incoming DN numbers. Also, microprocessor 210 may generate DTMF signals responsive to the user pressing one of the keys 218.

FSK converter 220 is connected to tip-ring pair 200 before switch hook 204, so that it may receive FSK signals while switch hook 204 is in the onhook position. FSK converter 220 receives FSK signals and translates the signals into computer-usable form. FSK converter 220 then delivers the digits to microprocessor 210.

To continue the example from FIG. 1, the telephone of FIG. 2 is telephone 25. Telephone line 200 is equivalent to line 13. When a call comes in for DN (Table 1) line 200 is a dependent line and line 11 (telephone 23) is lead. OAn FSK signal is sent via tip-ring pair 200 and received by FSK converter 220 at telephone 25. FSK converter 220 receives the FSK signal, translates it into digits, and sends the digits to microprocessor 210. Microprocessor 210 takes the digits converted from FSK signals, and determines the proper response by consulting programs in memory 214. Since the DN delivered through the FSK signals is not for this telephone, microprocessor 210 causes a key in keyset 218 to be illuminated, corresponding to DN 1. Microprocessor 210 may also cause audio device 212 to provide an alerting sound.

If the user of telephone set of FIG. 2 decides to answer the call, the user removes handset 208 from the switch hook, which causes processor 210 to provide an offhook signal to line unit 17 (FIG. 1). Line unit 17 provides a dial tone on tip-ring pair 200 through the telephone system which is audible at handset 208. The user then presses the key on keypad 218 with the light signal, which causes microprocessor 210 to send DTMF signaling to line unit 17 (FIG. 1). Line unit 17 then delivers the call to telephone 25.

Figure 3:
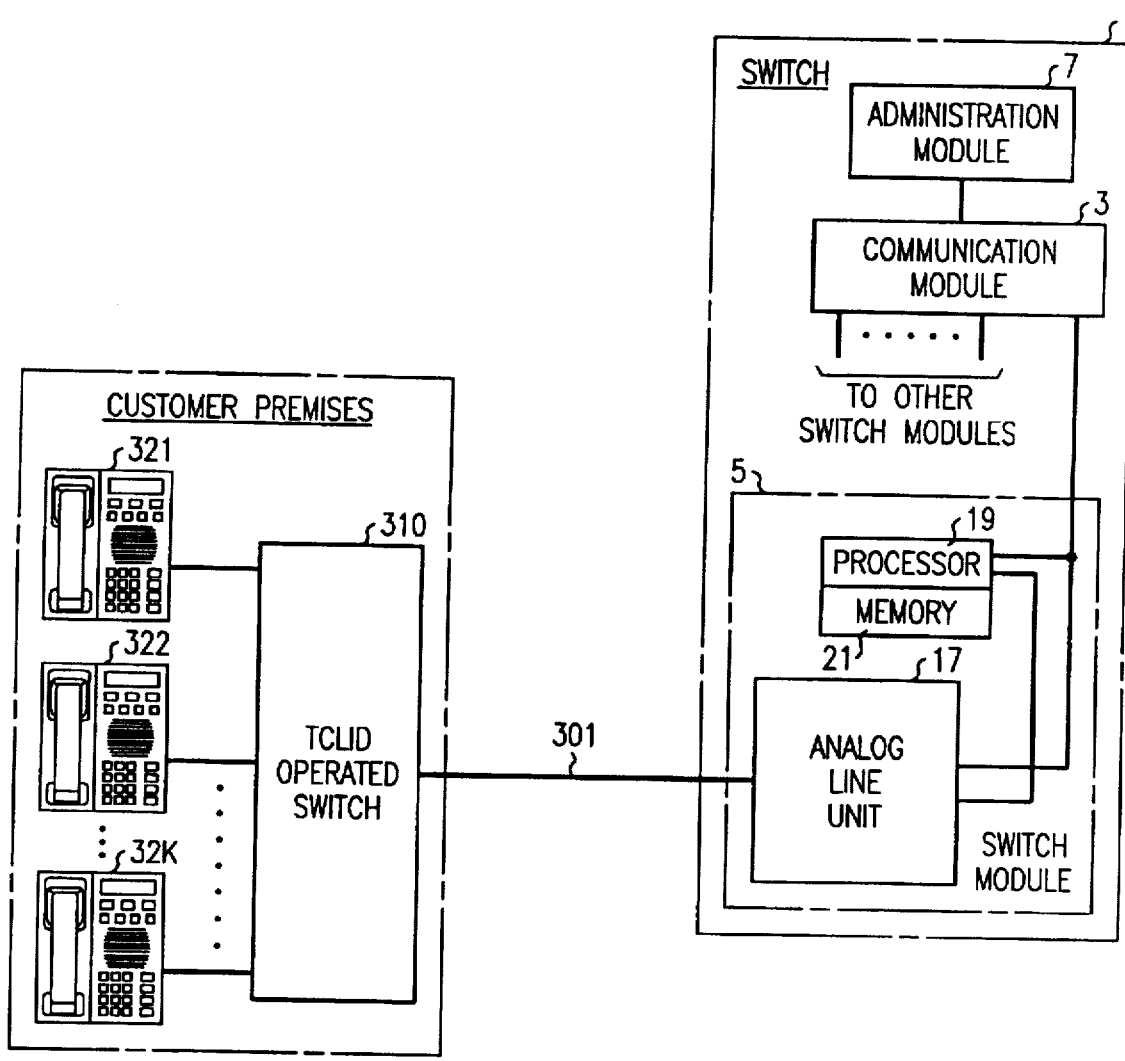
FIG. 3 is a block diagram of a second exemplary embodiment of this invention comprising a TCLID operated switch connected to a switching system via one line.

Turning now to FIG. 3, an alternative exemplary embodiment of an analog multibutton keyset is shown. In this embodiment, switch 1 is connected by a single line 301 to a TCLID operated switch 310. TCLID operated switch 310 provides a K×1 concentration of lines. That is, there can be up to K DNs associated with the customer premises. TCLID operated switch 310 is connected to a plurality of telephones on the customer premises, telephones 321-32K. Each of the telephones 321-32K may be associated with a different DN, DN1-DNK. However, this invention is not limited to each telephone being associated with a separate DN and multiple telephones may be associated with the same DN (and vice-versa) without departing from the scope of this invention.

As will be explained further below in connection with FIG. 5, when a telephone call arrives at switch 1 for one of DNs 1-K, switch 1 first checks to see if line 301 is busy. If line 301 is not busy, switch 1 generates an FSK signal, encoding the terminating calling line identification (TCLID). The FSK signal is sent across line 301 to TCLID operated switch 310. TCLID operated switch 310 converts the FSK signal into computer-readable form and, in response, connects the telephone associated with the directory number to line 301.

Interoffice communication is facilitated by this invention, in that TCLID operated switch 310 can, responsive to preprogrammed code signals from a telephone, connect one telephone to another telephone, for example, telephone 321 to telephone 322, without effecting a connection to switch 1. This will be described further, below, in connection with FIG. 5. Thus, for customers requiring more than one DN, but having facilities and/or needs for only one line, an interoffice communication system and Centrex-like features may be implemented by a small customer premise TCLID operated switch. Telephones 321, 322-32N may be analog multibutton keysets such as the keyset described in FIG. 2. TCLID operated switch may pass the FSK signal to any combination of telephones 321, 322-32N. Alternatively, telephones 321, 332-32N may be ordinary touchtone telephones, as is known in the art.

Figure 4:
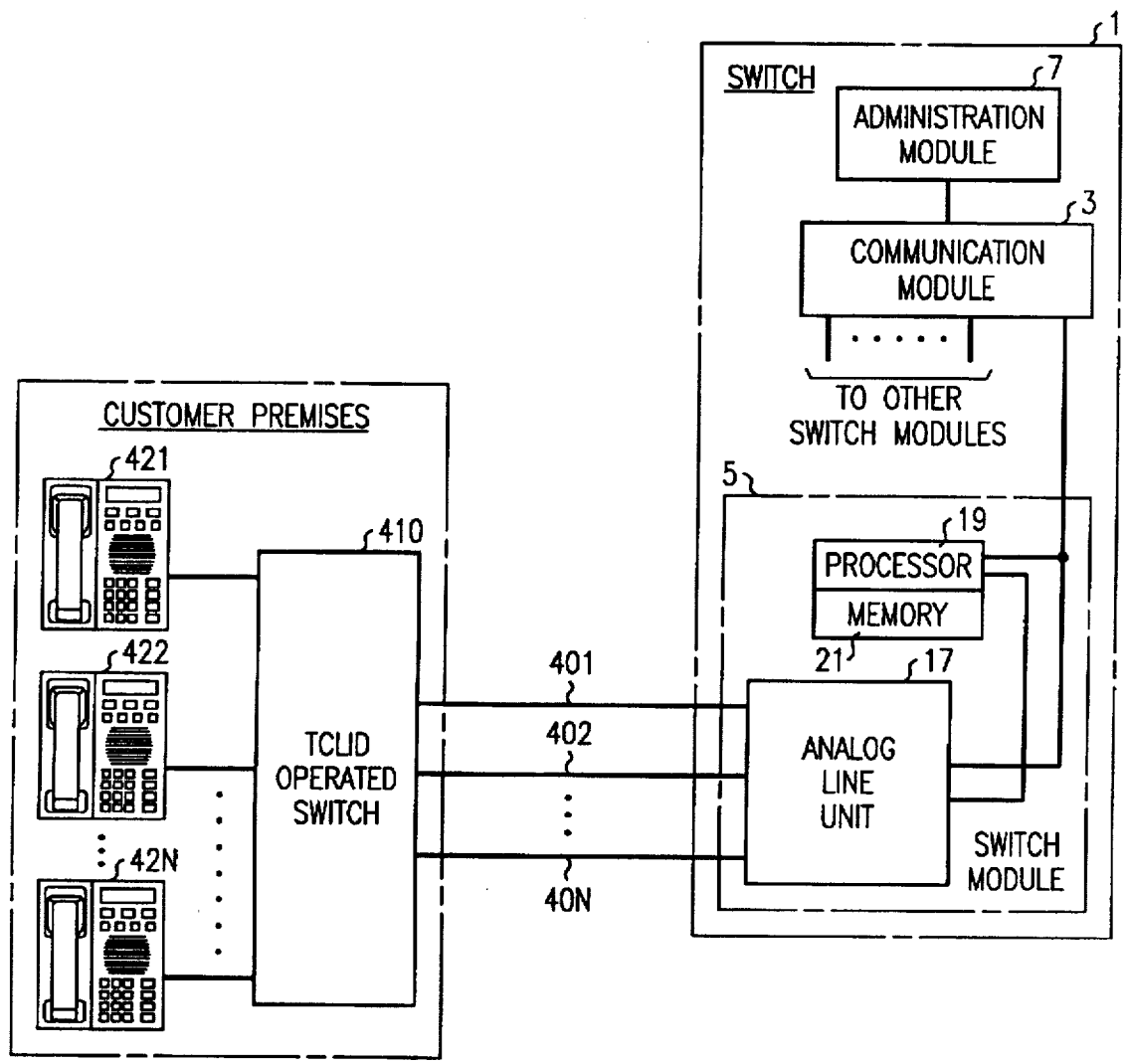
FIG. 4 is a third exemplary embodiment of this invention comprising a TCLID operated switch connected to a switching system via a plurality of lines.

A further exemplary embodiment may be seen in FIG. 4 wherein switch 1 is connected via lines 401, 402-40N to a TCLID operated switch 410. TCLID operated switch 410 is connected to a plurality of analog multibutton telephones 421, 422-42N on the customer premises. In this exemplary embodiment, telephones 421, 422-42N are associated with individual telephone numbers DN1, DN2-DNK respectively. There may be greater, fewer, or the same number of telephones as there are lines.

In the preferred embodiment of this invention, as a call comes in for a DN, for example DN2, line unit 17 in switch 1 hunts for a non-busy line in the group 401-40N, as is known in the art. (Alternatively, line unit could always route a specific DN on a specific line.) When line unit 17 has determined which line to deliver the call on, it encodes the terminating called line identification in an FSK signal, as described above, and sends the signal to the TCLID operated switch 410. TCLID operated switch 410 receives the FSK encoded TCLID, decodes it and attempts to deliver the call to the telephone associated with the TCLID, in this example telephone 422. In this embodiment, if telephone 422 is busy, TCLID operated switch 410 may deliver the call to another telephone, depending on a dependency scheme (as in TABLE 1 above) or may alert all telephones within an area or group that there is a call for one of the telephones by passing on the FSK signal, or generating other signaling. Thus, a small customer premises can enjoy all of the features of a large PBX system or Centrex system while having only minimal additional equipment on the customer premises.

Figure 5:
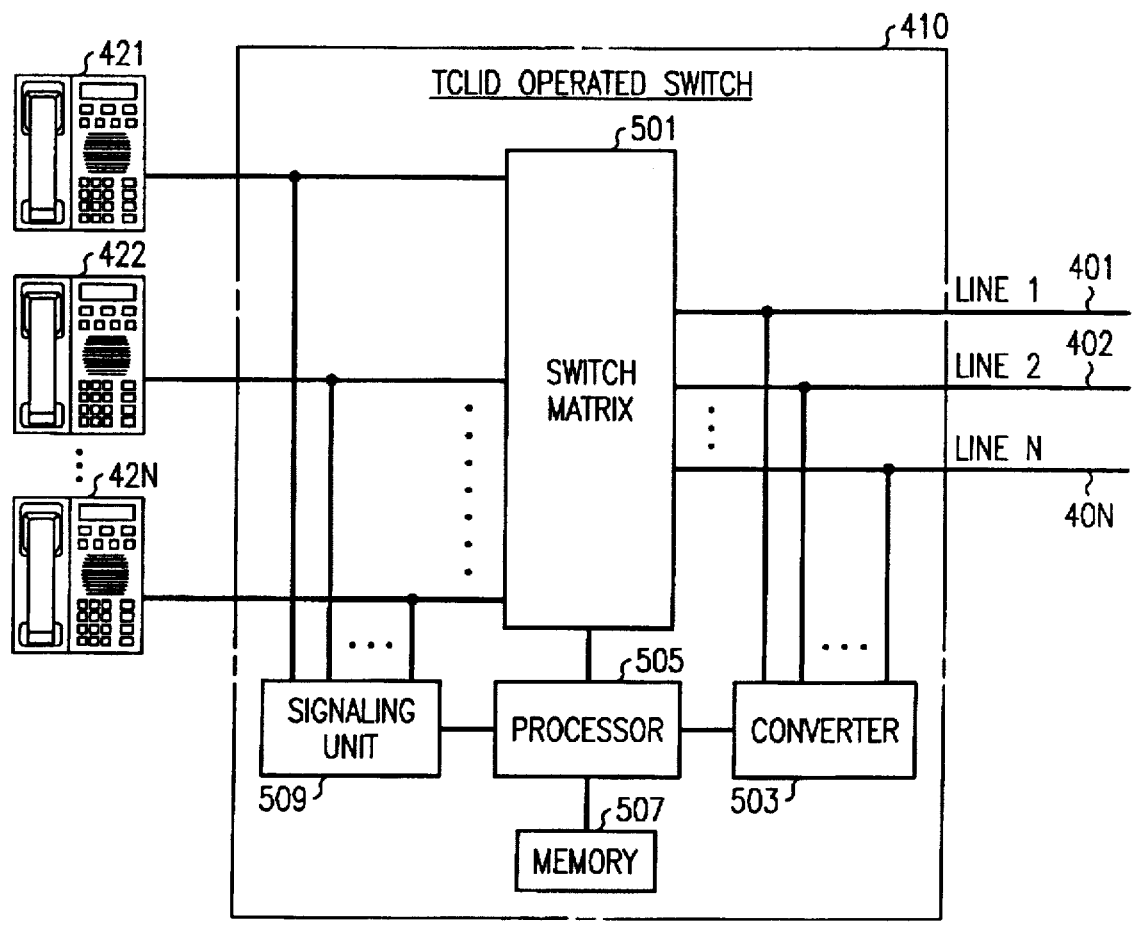
FIG. 5 is a block diagram of a TCLID operated switch as shown in FIG. 4.

Turning now to FIG. 5, a TCLID operated switch such as 410 in FIG. 4 is shown. Lines 401-40N entering TCLID operated switch 410 arrive at switch matrix 501. TCLID operated switch 410 differs from TCLID operated switch 310 in that switch 310 (in FIG. 3) only has one line coming in at switch matrix 501, otherwise operation is basically the same, and thus, only TCLID operated switch 410 will be described. An FSK converter circuit 503 is connected via a "Tee" connection to each of lines 401-40N. Converter circuit 503 detects an FSK signal on each of the lines when it is sent from switch 1 (FIG. 1) and passes the line number and the TCLID to a processor 505.

Processor 505 determines, via programs and data stored in memory 507, which telephone line 421-42N receives the call. Processor 505 determines whether the destination telephone is already busy and, if so, takes appropriate action. Otherwise, processor 505 causes switch matrix 501 to connect the line with the incoming call to the destination telephone. Processor 505 may, advantageously, forward the FSK signal or other signal to a display in the telephone or, alternatively, to all displays in all telephones to indicate an incoming call.

Processor 505 is also connected to signaling unit 509, which is operationally connected to all telephone lines between the telephones and switch matrix 501. Signaling unit 509 receives notice of offhook for the telephones so that processor 509 may connect an outgoing telephone call through switch matrix 501. Signal detection unit 509 may also receive DTMF signals from telephones 421-42N, as is known in the art, for implementing features such as intercoms, etc., in which processor 505 causes switch matrix 501 to connect one telephone to another without connecting it to one of the lines to the switch.

Figure 6:
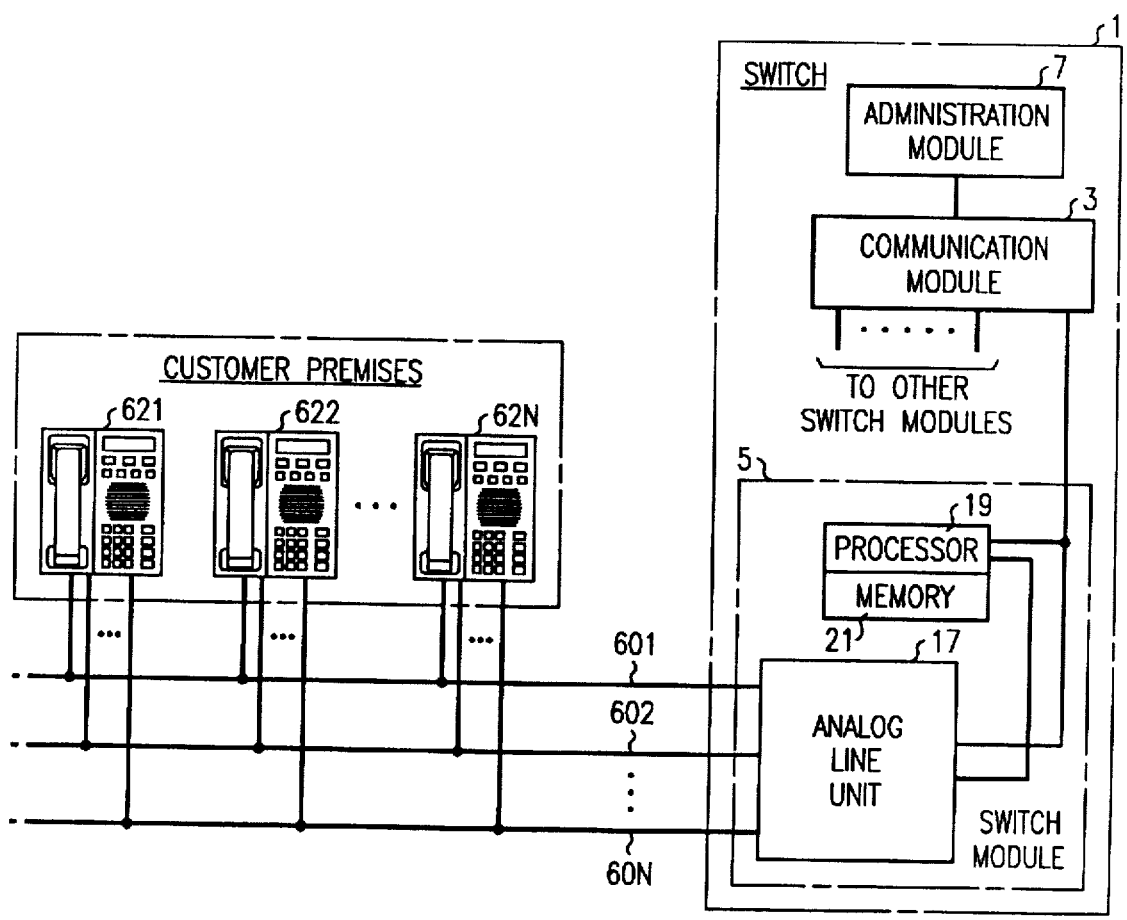
FIG. 6 is a further exemplary embodiment of this invention comprising a plurality of keysets connected to a switching system via a plurality of lines.

FIG. 6 shows a further exemplary embodiment according to another aspect of this invention. Multiple incoming lines 601, 602-60N connected to line unit 17 of switch 1 may all be connected to each telephone in customer premise 621, 622-62N. A small switching unit, such as the TCLID operated switch of FIG. 5 may be incorporated within each telephone or alternatively may be included near each telephone to provide termination of multiple lines for each telephone. An incoming call for one of the directory numbers associated with the telephones, for example DN1, could come in on one of the lines, for example 602. An FSK encoded TCLID is received from line unit 17 on each of the telephone stations on line 602. A converter circuit in each of the telephones, as described in FIG. 5, determines that the call is for DN1. DN1 may be, for example, associated with telephone 621. If telephone 621 is not busy, the switching unit causes telephone 621 to be alerted, as described above. One or more of the other telephones in the office may also be alerted according to a dependency scheme as described above. To answer a call, a key is pressed, which causes the telephone to be connected to the line on which the signal was received.

An alternative embodiment may be seen in the context of FIG. 6, wherein line 60N is designated as a dedicated signaling line. In this embodiment, telephones 621, 622-62N may signal to SM 5 without interrupting anything on a line in use. For example, if telephone 621 were connected to line 601 and the user wants to add a third party on a normal analog line, the user flashes the switch hook. In this embodiment of this invention, the user presses a key which causes signaling to be sent on line 60N. The signaling may be DTMF digits, may be special codes, or even digital packets.

Figure 7:
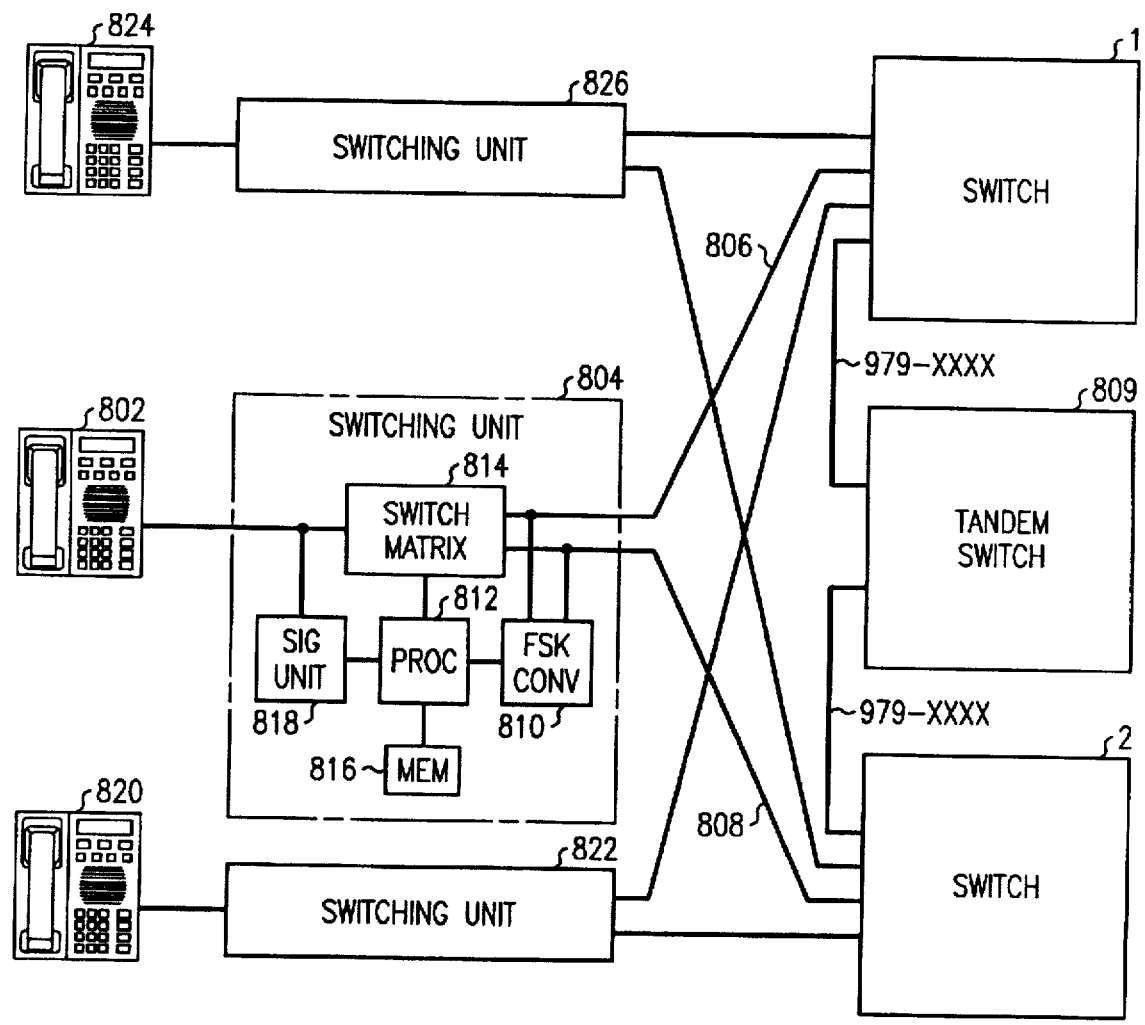
FIG. 7 is an exemplary embodiment of this invention wherein a TCLID operated switch is connected to multiple switching systems.

Turning now to FIG. 7, an ultra-reliable system using an analog multibutton telephone keyset according to this invention is shown. Telephone 801 is connected to a control unit 804 according to this invention. Telephone 802 could also incorporate control unit 804 without departing from the scope of this invention. Control unit 804 is connected via line 806 to switch 1, and line 808 to switch 2. Both switch 1 and switch 2 are connected to tandem switch 809 via trunks, as is known in the art. In this exemplary embodiment of this invention, tandem switch delivers calls for a specific office code, for example 979, to both switches 1 and 2. Tandem switch may deliver these calls by alternating between offices or by an algorithm for load distribution. Switch 1 delivers calls for the DN associated with telephone 802 on line 806, and switch 2 delivers calls for the DN associated with telephone 802 via line 808, as is known in the art. When a call comes in for telephone 802 from, for example, switch 1, an FSK encoded TCLID sent on line 806. FSK converter 810 receives the FSK signal, translates it and delivers it to processor 812. Processor 812 determines how to connect switch matrix 814 by consulting programs and data stored in memory 816. Processor 812 configures switch matrix 814 to connect line 806 to telephone 802 and causes signaling unit 818 to cause an alerting signal to be given at telephone 802.

To place an outgoing call from telephone 802, the user signals by lifting the switchhook or other means which is detected at signaling unit 818 and reported to processor 812. Processor 812 configures switch matrix 814 to connect telephone 802 to one of lines 806 or 808. Telephone 802 can be connected to lines 806 and 808 by alternating between the two or by a determination as to how quickly dial tone is received from the line. In this manner, if one of switch 1 or switch 2 were blocked, the user of telephone 802 may still be fully operational (i.e., it may place outgoing calls and may still receive incoming calls).

An entire Centrex-like system may use this ultra-reliable service as seen in FIG. 8. Telephone 820 with converter 822 is connected to both switches 1 and 2, as is telephone 824 through converter 826. As in the embodiment of FIG. 1, when a call comes in for a telephone with a DN associated with telephone 802, switch 1 or switch 2 sends FSK signals to converters 822 and 826, as well as 804. In this embodiment, if, for example, the user of telephone 824 wishes to intercept or receive a call for telephone 802, the user would pick up the handset and the processor in unit 826, having detected the FSK signal, would cause the switch matrix to connect telephone 824 to the same switch that sent the FSK signal. The user of telephone 824 could then signal the switch to deliver the call through that telephone, as described above, in connection with FIG. 1.

It is to be understood that the above-described embodiments are merely illustrative principles of the invention, and that many variations may be devised by those skilled in the art without departing from the scope of this invention. It is, therefore, intended that such variations be included within the scope of the appended claims.

I claim:

1. An analog multibutton keyset for use at a customer premises, said customer premises having a plurality of keysets connected to a switching system by a single analog line and a plurality of directory numbers (DNs) assigned to said line, said analog multibutton keyset comprising:

means for connecting said keyset to said switching system by said single analog line;

means for indicating which one of said plurality of DNs is being called, said indicating means being responsive to a signal representing one of said DNs, said signal being sent by said switching system on said single analog line prior to said switching system sending a ring signal to cause ringing at said analog multibutton keyset; and means for signaling to said switching system to deliver said incoming call to said keyset via said individual analog line.

2. The keyset of claim 1 wherein said indicating means includes means for converting said signal into digits and means responsive to said digits for informing a user of said DN of the call.

3. The keyset of claim 2 wherein said means for converting said signal into digits comprises a frequency shift key demodulator.

4. The keyset of claim 2 wherein said informing means comprises a visual display.

5. The keyset of claim 2 wherein said informing means comprises an audio alerting system to provide distinctive ringing for each DN.

6. The keyset of claim 1 wherein said signaling means comprises plurality of keys, wherein each of said keys causes signaling to be generated.

7. The keyset of claim 1 wherein said signaling means comprises a plurality of buttons on said keyset, wherein each of said buttons causes DTMF signals to be generated in response to being pressed.

8. In a telephone network comprising a telephone switching system connected by one line to each of a plurality of analog multibutton keysets, said plurality of keysets being associated with a plurality of directory numbers (DNs), a method comprising the steps of:

in response to an incoming call to a terminating one of said plurality of DNs, said telephone switching system sending a signal representative of the terminating one DN of said call to one or more of said plurality of keysets prior to sending a ringing signal;

said one or more of said plurality of keysets indicating the presence of an incoming call for said terminating DN;

one of said keysets signaling to said telephone switching system that it is ready to answer said call; and said telephone switching system delivering said incoming call only to the one of said keysets first to signal to said telephone switching system.

9. The method of claim 8 further including the step of setting up said call to a lead one of said plurality of keysets.

10. The method of claim 8 wherein said step of sending a signal includes encoding the terminating DN of a call in a frequency shift key signal.

11. The method of claim 10 further including the step of said one or more of said plurality of keysets decoding said frequency shift key encoded DN.

12. The method of claim 8 wherein said step of said one or more keysets indicating an incoming call comprises said one or more keysets displaying said terminating DN.

13. The method of claim 8 wherein said step of said one or more keysets indicating an incoming call comprises said one or more keysets audibly alerting by a ringing signal that is different for each DN.

14. The method of claim 8 wherein signaling said switching system comprises sending dual tone multifrequency signaling to said switching system responsive to operation of a button on said one more of said plurality of keysets.

15. The method of claim 8 further including the step of setting up a terminating call to a lead one of said plurality of keysets; and said step of sending a signal comprises sending said signal to said lead one of said plurality of keysets and to one or more dependent ones of said plurality of keysets.

16. The method of claim 15 wherein said step of delivering said incoming call comprises delivering said call to said lead keyset if said lead keyset sends an off hook signal, and delivering said call to one of said dependent keysets if said one of said dependent keysets sends a call pick up signal.

17. An analog multibutton keyset for use at a customer premises, said customer premises having a plurality of keysets, said keyset being connectable to a switching system by a plurality of lines, said plurality of lines being associated with a plurality of directory numbers (DNs), said switching system providing a signal on one of said lines representative of a terminating called line identification (TCLID) responsive to an incoming call prior to sending a ringing signal, said analog multibutton keyset comprising:

switching means for connecting said keyset to one of said plurality of lines;

means responsive to said signal to indicate which one of said plurality of DNs is being called; and means for signaling to said switching system to deliver said call to said keyset via said one of said plurality of lines.

18. A customer premises switch connected to a central office switching system by one or more lines, said switch connectable to a plurality of telephones in a customer premises, said central office switching system sending signals representative of a terminating called line identification (TCLID) responsive to an incoming call prior to sending a ringing signal to said switch on one of said lines, said switch comprising:

means for decoding said signals from said central office switching system connected to said plurality of lines; and means for connecting said one of said lines to a telephone responsive to said decoded signals.

19. An analog multibutton keyset for use at a customer premises, said customer premises having a plurality of keysets, said plurality of lines being associated with a plurality of directory numbers (DNs), said keyset being connectable to one or more switching systems by a plurality of lines, said switching system providing a signal representative of a terminating called line identification (TCLID) responsive to an incoming call prior to sending a ringing signal, said analog multibutton keyset comprising:

means responsive to said signal to indicate which one of said DNs is being called; and means for signaling to said switching system to deliver said call to said keyset via one of said plurality of lines.

20. An analog multibutton keyset according to claims 17 or 19 wherein said means to indicate comprises a display.

21. An analog multibutton keyset according to claims 17 or 19 wherein said means to indicate comprises an audio device that signals differently for each of said DNs.

22. An analog multibutton keyset according to claims 17 or 19 wherein said means for signaling comprises keys responsive to being pressed for sending coded messages to said switching system.

23. An analog multibutton keyset according to claims 17 or 19 wherein said means for signaling comprises dual-tone, multifrequency generating buttons.

* * * * *